United States Patent [19]
McQuinn

[11] Patent Number: 6,089,743
[45] Date of Patent: Jul. 18, 2000

[54] DELAY COORDINATING SYSTEM FOR AGRICULTURAL MACHINES

[75] Inventor: Alvin E. McQuinn, Edina, Minn.

[73] Assignee: AG-Chem Equipment Co., Inc., Minnetonka, Minn.

[21] Appl. No.: 08/766,420

[22] Filed: Dec. 12, 1996

[51] Int. Cl.[7] .................................................. G06F 19/00
[52] U.S. Cl. ......................... 364/479.1; 239/69; 111/130; 111/903; 701/50
[58] Field of Search .......................... 364/479.11, 479.01, 364/479.1, 167.02, 167.07; 701/50; 340/684; 239/1, 11, 61, 69, 155; 111/130, 200, 903, 904; 222/52, 129; 221/2, 9

[56] References Cited

U.S. PATENT DOCUMENTS

| | | | |
|---|---|---|---|
| Re. 35,100 | 11/1995 | Monson et al. ......................... | 111/130 |
| 3,861,337 | 1/1975 | Thompson .................................. | 111/1 |
| 4,239,010 | 12/1980 | Amburn ...................................... | 111/1 |
| 4,630,773 | 12/1986 | Ortlip ......................................... | 239/1 |
| 5,355,815 | 10/1994 | Monson .................................... | 111/200 |
| 5,453,924 | 9/1995 | Monson et al. ......................... | 364/131 |

*Primary Examiner*—Joseph Ruggiero
*Attorney, Agent, or Firm*—Kinney & Lange

[57] ABSTRACT

An improved mobile agricultural products crop input application control system including a delay coordinating system particularly adaptable for use in site-specific (precision) farming, wherein selected discrete delay information unique to each on-board crop input storage release point, crop input transport system, and/or crop input dispensing point is combined with anticipated field reference point data obtained with a machine positioning system, e.g. "Dead Reckoning", GPS, and/or radar, and a computer, to direct independent functioning of selected on-board storage devices, material transport systems, crop input release point mechanisms and/or dispensing point mechanisms to ensure stored crop inputs are released for a timely combination to achieve a predetermined quantity and prescription of crop inputs delivered to the anticipated field reference point as the crop input applicator machine(s) travels over a predetermined geographic land area. The delay coordination system provides environmental advantages to all through enhanced resource management by more accurately and precisely placing crop inputs resulting in a significant improvement in the use of crop input resources.

29 Claims, 11 Drawing Sheets

DELAY COORDINATING SYSTEM FOR AGRICULTURAL MACHINES

BACKGROUND OF THE INVENTION

1. Field of the Invention

This present invention relates generally to control systems, and more particularly to a delay coordinating system for controlling a plurality of agricultural products (crop input) release points on an agricultural machine in response to various inherent delay times between predetermined vehicular mounted control points and the ultimate machine crop input dispensing points. The time variance of each different dispensing point and release point must be measured and all the varying times coordinated by a computer program to bring them all together at the precise moment in time for the desired dispensing moment.

2. Description of the Prior Art

Various agricultural product applicator systems and associated methods of control have been suggested at one time or another, but in each instance, these systems leave something to be desired. For example, there is a need for an applicator system that ensures agricultural products dispensed from a moving applicator machine are accurately and precisely combined prior to being dispensed. Agricultural product applicator systems which estimate an average composite dispensing delay time experienced when dispensing crop inputs from a moving product applicator machine have been developed. Generally, these systems are limited to use of a cursor on a display device to locate a field reference point in front of a moving machine and then apply an estimated or average product dispensing delay time such that conveyance or flow of any/all product(s) to be dispensed at the field reference point will be initiated at a single common predetermined moment before the machine reaches the target point. The point at which product flow is initiated is determined from factors including ground speed of the applicator machine and the total amount of time it takes from the moment when crop input flow is initiated from onboard the machine and the moment a crop input is dispensed from a wet boom, dry boom, and/or injector tube, for example. However, the variable nature of flows and random locations of various crop input release points associated with multiple storage devices create unaccounted for delays and result in misapplications and inaccurate combinations of multiple crop inputs.

One system known to those skilled in the art of agricultural products (crop input) application includes an agricultural machine having a single bin containing planting products such as seeds or crop input application products such as herbicides, insecticides, fertilizer, anhydrous ammonia, various chemicals, or other crop input products. Generally, such systems are ground-speed coordinated to start metering crop inputs from the product bin when the applicator machine reaches the target point, generally ignoring the lag or delay time between the start of product release from the product bin and the time a desired product reaches the ground.

Still needed, but not available with product applicator machines and associated control systems presently known in the art is an agricultural products crop input applicator system which allows a product applicator machine to commence and terminate metering a plurality of planting or crop input products at different moments in time for a common reference point in a field, for example. Such a need exists for product applicator machines having multi-product storage devices such as bins mounted upon the machine or having multi-conveyor and/or product flow devices or having multi-point product dispensing devices, for example. It can readily be appreciated that use of a single estimated or average composite system delay will be inadequate to provide for accurate and precise application of multiple agricultural products when variable rate applications are being made, i.e. where more than a single product, storage device, e.g. bin, or material transport system, i.e. conveyor is used with the machine.

A solution is to provide a variable rate, multiple crop input applicator machine with a time delay coordinating system which is capable of taking into consideration the nature of the individual products to be dispensed, the location of the individual product storage devices, i.e. bins, boxes, tanks, etc., and the type and nature of each dispensing device employed, wet booms, dry booms, nozzles, conveyors, spinners, planters, drop tubes, injectors, etc., as well as the ground speed when variable rate applications are made across a field. Such a coordinating system must be capable of evaluating each system feature such as stated above and coordinating a unique delay time for each agricultural product (crop input) dispensed from the applicator machine. Using such a system will then prevent premature or latent application of the agricultural products (crop inputs) to a desired target area traversed by the applicator machine. Unless the timing delay differences associated with the various machine release points are considered and coordinated, accurate and precise applications are impossible. The present invention provides a solution for the management and control of the aforesaid differences.

Modern applicator machine control systems typically have a host controller located within the operator cab of the machine, including a processor with associated input and output devices. The host is generally directly linked to at least one other controller which may also be located within the cab, and which is responsible for all communication to devices on the machine, such as shown in U.S. Pat. No. 4,630,773, issued Dec. 23, 1986, to Ortlip, entitled Method and Apparatus for Spreading Fertilizer, and U.S. Pat. No. Re 35, 100, issued Nov. 28, 1995, to Monson et al., entitled Variable Rate Application System, both assigned to Ag-Chem Equipment Company, Inc. of Minnetonka, Minn., the Assignee of the present invention. The system disclosed in the '100 reissue patent comprises a controller accessing a soil map indicating a soil characteristic for each portion of the field. Field locations and status maps indicating current crop input level at various locations in a field to be treated are monitored by a control system. A crop input map is updated after a dispensing pass to provide a real-time record. Position locators for the machine in the field may include "Dead Reckoning", GPS, or LORAN systems, for example.

Similarly, U.S. Pat. No. 5,355,815 discloses a closed-loop variable rate applicator. The system operates by determining a soil prescription in near real-time and dispenses crop inputs to the soil scene as a fraction of the soil prescription. The '815 patent is also assigned to Ag-Chem Equipment Company, Inc. and is incorporated herein by reference in its entirety.

Another system is disclosed in U.S. Pat. No. 5,453,924, issued Sep. 26, 1995, to Monson et al., entitled Mobile Control System Responsive To Land Area Maps. This system expands on earlier known applicator machine controls systems including those assigned to Ag-Chem Equipment Company, Inc., by incorporating a network scheme which links a host controller positioned within the operator cab to multiple controllers located at various points on the machine external to the operator cab. All of the above patents are assigned to the Assignee of the present invention and are incorporated by reference in their entirety herein. The control systems discussed herein above describe systems which, when properly adapted with the inventive algorithmic software and associated control devices, may be used to practice the present invention.

SUMMARY OF THE INVENTION

The limitations of the background art discussed herein above are overcome by the present invention which includes a delay coordination control system adapted for use on variable rate, multiple crop input applicator machines, and particularly agricultural products (crop input) applicator machines. As used herein, the term crop input applicator includes, but is not limited to any self-propelled or towed fertilizer spreaders, chemical applicators, planter devices, e.g. corn planter, seed drill devices, air seeders, air spreaders, and any dispensing devices that spread, apply and/or inject crop inputs, e.g. lime, inserve, crop protection agents, granular and liquid herbicides, insecticides, fertilizers, chemicals, anhydrous ammonia, nitrogen inhibitor, micronutrients, seeds, and any combinations thereof, for example. The present inventive product applicator system addresses the problems associated with the effects of uncoordinated and undesirable individual system delays in agricultural products (crop input) delivery rates and quantities which result from use of multiple agricultural products, multiple product storage devices, multiple material transport systems, multiple metering release points, and/or multiple product dispensing devices attached to a product applicator machine.

The present inventive variable rate, multiple product applicator system also provides solutions for the problems associated with the interactive effects of the aforesaid machine features where a single product is combined with a plurality of product storage devices, one or more material transport systems, and a plurality of dispensing devices. The delay coordination system is a ground-speed coordinated system which is customized to ensure accurate and precise application of agricultural products crop inputs to a desired target area being traversed by the application machine, regardless of inherent delay differences in individual storage devices such as bins, boxes, tanks, etc., as well as inherent delay differences in individual conveyor mechanisms, flow devices, etc., and inherent delay differences between multiple crop input metered release points and dispensing points located on the machine. The increased precision and accuracy provided by the present invention also results in significant environmental advantages and gains by all as a consequence of reduced waste related to resource usage due to improved placement of crop inputs. As used herein, ground-speed or machine speed means machine velocity. Crop input release point means the actual point where a stored product is discharged from a product storage device via a product metering device. Crop input dispensing point means the actual point where a crop input product is discharged from the application machine. The delay coordination system can also be adapted to consider delay time differences due to distinctions in the viscosity and frictional flow characteristics for the different agricultural products (crop inputs) being dispensed from the applicator machine.

Use of the present delay coordination system allows each variable rate applicator machine to be customized to provide the optimum results for the end users. For example, any specific machine can be customized by altering the number and particular location of product storage bins mounted to the applicator machine. Delay times for a particular storage bin may differ by as much as six to seven seconds, for example. Therefore, for accuracy, it may be necessary to instruct the product metering device to initiate the product stored in one bin to start flowing six to seven seconds before the product stored in a different bin. Controlling these time flow differences is necessary when products from different bins must reach the ground at the same point and time. Similar differences exist with various types and locations of flow mechanisms, conveyor mechanism, etc. The time variance of each different dispensing point and release point must be measured and all the varying times coordinated by algorithmic software to bring them all together at the precise moment in time for the desired dispensing moment.

While today, grid samples and other agronomic information are most commonly taken in two acre and above land increments, it is anticipated by the present inventor that conducting of a much more intense level of soil testing, e.g. tissue sampling, as well as implementation and use of other systems to determine crop input requirements at a given site will become desirable, viable and economically feasible. Even now, yield monitor data is collected in real time and can be used to help establish site-specific crop input requirements. Significant changes in soil conditions have been found by the present inventor, to occur even within a distance of a few feet, for example. Therefore, the importance of tighter control of crop input application has and will continue to become more relevant and necessary.

The present inventive delay coordination system therefore provides a vast improvement over product application systems known in the art which use cursor anticipation devices and methods to estimate a single fixed universal estimated composite delay time for a moving applicator machine to provide some increase in accuracy and precision when dispensing products. The aforesaid improvement is the result of providing a system, as stated herein before, in which each specific control point and its associated crop input metered release point on the applicator machine are customized with a precise delay time thereby ensuring that any product to be dispensed is accurately applied. In this way, each product is dispensed for a desired target area of known conditions, all based upon formerly measured conditions and values for that desired target area.

In one aspect of the present invention, the construction and arrangement is employed wherein a variable rate, multiple crop input applicator delay coordination system is programmed relative to individual ideosyncrocies of an individual agricultural products (crop input) applicator machine, i.e. location, length and type of individual and distinct conveyors and spreading devices such as a spreading wheel or tool bar, specific bin delay differences between multiple bins, etc.

In yet another aspect of the present invention, the construction and arrangement is employed wherein a product applicator delay coordination system is employed to consider individual ideosyncrocies of one or more attached applicator machines such as a towed machine or multiple units, side by side or towed in tandem.

A feature afforded by the present invention is improved precision and accuracy of product dispensation including the desired mix and prescriptive quantity of product delivered at an anticipated location of known conditions based upon formerly measured conditions and values at the anticipated location when the product applicator machine arrives at the desired target location in a field.

Another feature afforded by the present invention is the provision of a delay coordination system which is adaptable for use with any type and combination of one or more applicator machines.

Yet another feature afforded by the present invention is the provision of a delay coordination system which allows any desired product applicator machine or combination of applicator machines to be adapted for precision applications of crop inputs. Such modifications will maintain the integrity of the product application process in any manner.

Still another feature afforded by the present invention is the provision of a delay coordination system which is adaptable via algorithmic software for use with various variable rate, multiple product applicator machines, such as between a powered applicator machine and any combination of one or more towed machines, or between different and distinct applicator machines, all while preserving the integrity of the product application process associated with the machine.

Still another feature afforded by the present invention is the provision of a system resulting in environmental gains for all due to reduced wasting of resources as a consequence of greater accuracy and placement, i.e. place the crop input where it is needed and will be used, of those resources, e.g. seed, fertilizer, and farm chemicals.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION OF THE PREFERRED EMBODIMENTS

The preferred embodiments described as follows, address the long felt need by those in the agricultural industry to provide a planting and crop input product application system capable of accurately and precisely dispensing a plurality of agricultural products (crop inputs) simultaneously in a desired mix and/or prescriptive quantity at an anticipated location when the machine arrives at the anticipated location in a field. In accordance with the preferred embodiment of the present invention, and with particular attention being directed to FIG. 1, a simplified block diagram illustrating one embodiment of a delay coordination system 50 suitable for implementing multiple crop input release points and/or dispensing points delay coordination for a variable rate product application machine is shown to include a host computer 14, a GPS (Global Positioning System) receiver 52, and a radar device 54. The GPS is an accurate three-dimensional global positioning satellite system which provides radar positioning and navigation needs for the product application machine. GPS systems are known to those skilled in the art of satellite positioning systems and will therefore not be discussed in great detail except as made reference to herein after. The present invention is compatible for use with "Dead Reckoning" systems and satellite positioning systems such as AgNav™, Navstar Global Positioning System, Differential GPS Systems and other GPS based or equivalent systems to cooperatively update a resident positioning and navigation data base on a real-time basis. Generally, the GPS is initiated when the receiver 52 starts to track pseudorandom noise from multiple satellites and generates GPS data which is subsequently used by the machine control system, e.g. FALCON® to estimate time of arrival values for the machine to arrive at an anticipated location in a field, for example. A more detailed description of a GPS system can be found in U.S. patent application to Robert J. Monson, filed Jan. 22, 1996, Ser. No. 08/589,324 entitled AUTOMATIC TOPOGRAPHICAL MODEL GENERATION METHOD AND APPARATUS, abandoned, which is incorporated by reference in its entirety herein. Working in combination with one another, the GPS receiver 52, radar device 54, and host computer 14, then track and anticipate a product application machine reference point in a field, including machine location, speed, and direction.

Figure 1:
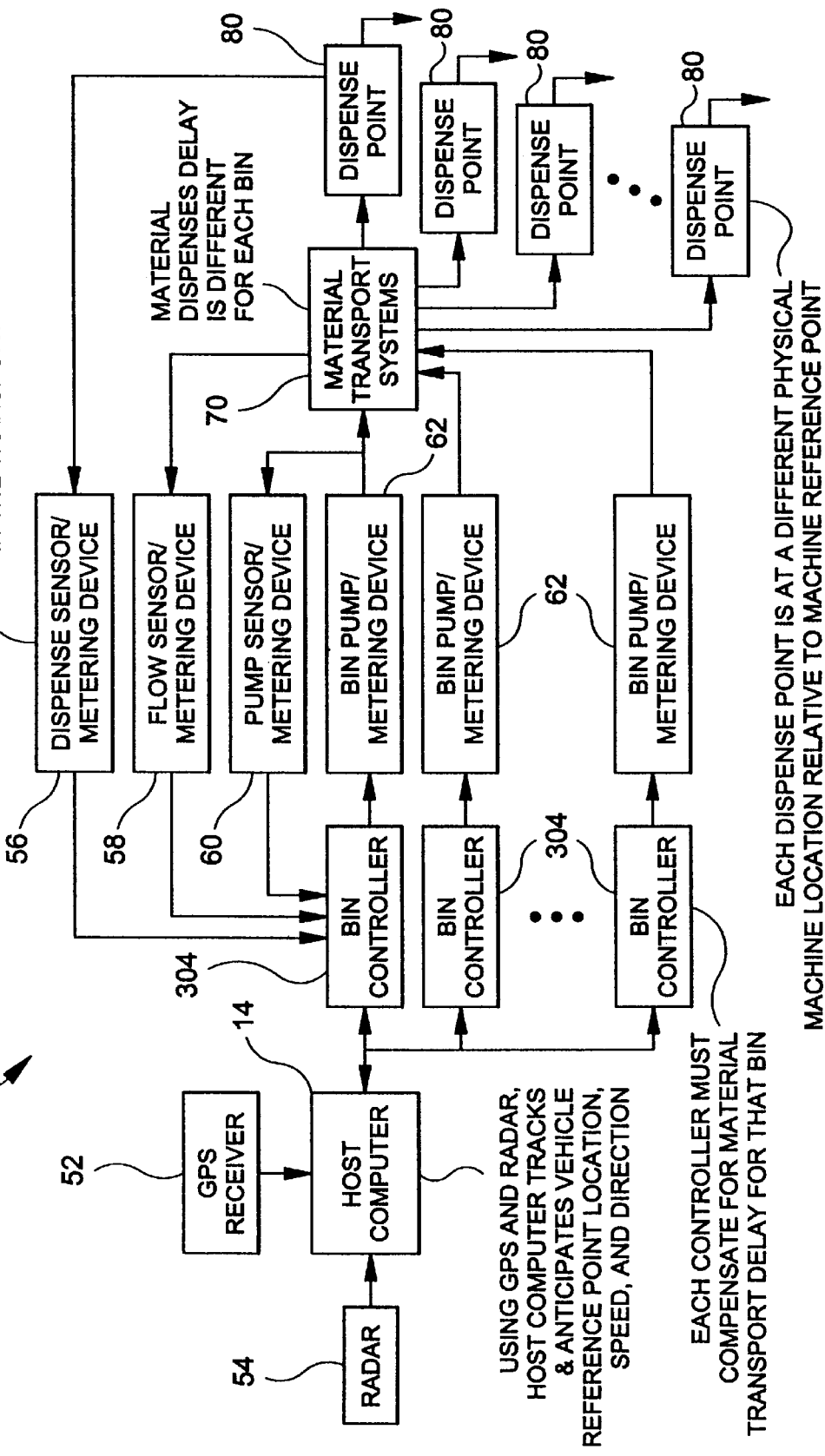
FIG. 1 is a simplified block diagram illustrating one embodiment of a delay coordination system suitable for implementing metering point delay coordination for a variable rate, multiple agricultural products (crop input) application machine in accordance with the present invention.

Looking again at FIG. 1, the delay coordination system 50 may have multiple control devices 304. Heretofore, delay coordination has been accomplished by provision of a single average composite application machine delay incorporated into the application machine control system. It is recognized by few skilled in the art, that a certain delay or lag time exists between the moment when a controller instructs or initiates a product flow process onboard the machine and the moment the product is actually dispensed from the machine onto the ground. One attempt to solve this problem in the application equipment industry has been to use a single fixed estimated or average composite delay coordination process to eliminate product spreading inaccuracies. However, unless the timing from the various machine release points are considered and coordinated, accurate and precise applications are impossible. This invention provides a system to manage and control these differences.

The present inventor has found that product spreading inaccuracies are often unacceptable, especially when spreading or dispensing multiple products, or products stored in multiple storage devices attached to a variable rate product application machine or any multiple combination of variable rate applicator machines thereof For example, it is not unusual for product being dispensed from one bin to actually strike the ground six to seven seconds before or after a product dispensed from a second different bin strikes the ground, when product flow from both bins is simultaneously initiated. A machine which is moving at twenty mile per hour may therefore inaccurately apply one or more of the products to the ground more than two-hundred feet away from the anticipated reference point. Such inaccuracies have been found by the present inventor to be unacceptable because significant differences in site-specific conditions can easily occur within a distance of only a few feet. Taking into consideration the cost of seed, fertilizer, chemicals, and other crop inputs, environmental concerns, and the depressed product yields possible from improper application of crop input mixes and incorrect prescriptive quantities, a need presently exists for an improved delay coordination system. Such a system must take into consideration, the individual metering point timing delays inherent on a variable rate multi-product application machine. Such a system will ensure that the product flow process associated with each product (crop input) release point and/or dispensing point attached to the variable rate application machine is initiated at a unique and distinct moment in time as the machine traverses a field to ensure a desired prescription and quantity of crop inputs is delivered to an exact field point for which they were intended. This process then contrasts with earlier known application systems where the product flow processes for all product release points and dispensing points attached to the application machine are at best simultaneously initiated at a common moment in time, but most often completely ignored.

With continued reference to FIG. 1, the present delay coordination system 50 also will have incorporated multiple metering points including, but not necessarily limited to storage bin release point pumps, meters and sensors 60, and/or flow meters and sensors 58, and/or dispensing point meters and sensors 56. These devices 56, 58, 60 are used to control and measure the product flow rates at different locations within the delay coordination system 50. For example, product flow from a storage bin is initiated when a bin controller 304 is instructed via host computer 14 to actuate an associated control device 62. It will be appreciated that any control device 62 may have metering characteristics different from other control devices 62 within the delay coordination system 50. Therefore, each may have distinct and characteristically different metering rates than other control devices 62 within the delay coordination system 50. Likewise, the delay coordination system 50 may have incorporated multiple material transport systems 70, or may have a common material transport system 70 interconnected to product storage devices located at different points on the application machine or multiple combinations of machines thereof Such material transport systems 70 and/or structures also create different product flow rates throughout the system 50. Similarly, multiple dispensing points 80 or product release points (enumerated as 306 in FIG. 4) may also be incorporated at different physical machine locations. Such different physical locations will add to differences in individual product flow times between system release points 306 and associated product dispensing points 80 within the delay coordination system 50. For example, it is known that wet booms and dry booms are commonly used to spread agricultural products (crop inputs) onto the ground as a spreading machine traverses a field. These booms have multiple product dispensing points 80 dispersed over the entire length of the booms. Thus, products to be spread onto a field through such booms will exit the product dispensing points 80 sequentially as the product reaches each product dispensing point 80. Each dispensing point 80 within the boom will then have a unique and distinct process delay dependent on the physical machine location of the dispensing point 80 relative to a machine reference point. The present delay coordination system can be adapted for use with appropriate spray nozzle controls to control actuation of individual dispensing point spray nozzles, thereby controlling the delay times associated with each respective dispensing point 80.

The present invention is not so limited however, and it will readily be appreciated that any variable rate multiple product application machine having an on-board computer 14 and a machine tracking system such as a GPS receiver 52 in combination with a radar device 54 can be adapted to operate in conjunction with the delay coordination system 50, regardless of the location, nature and type of product storage devices, controller devices, metering devices, sensor devices, material transport mechanisms and devices, and crop input release points and dispensing point locations and mechanisms. The present delay compensation system 50 can easily be customized to work with any one or more variable rate multiple product application machines, powered or towed, including combinations thereof, using either manual or automatic data entry. For example, the application machine can be customized by operating the machine and taking manual measurements of the delay times between activation of selected metered release points and the ultimate dispensing of crop inputs. The delay time for each distinct path can then be entered into the host computer 14 via a keyboard, for example. The time difference between each metering point must be entered into an algorithmic software data base for each variable rate machine.

Every variable rate crop input application machine has its own system of electronics, hydraulics and control mechanisms which may be unique unto itself or common to a family of variable rate application machines. The present inventive system and method takes these machine characteristics into consideration to coordinate the necessary electronics, hydraulics and control mechanisms in order to achieve accurate combinations and precise placement of crop inputs thereby elevating state of the art variable rate application technology to a higher level.

Figure 2:
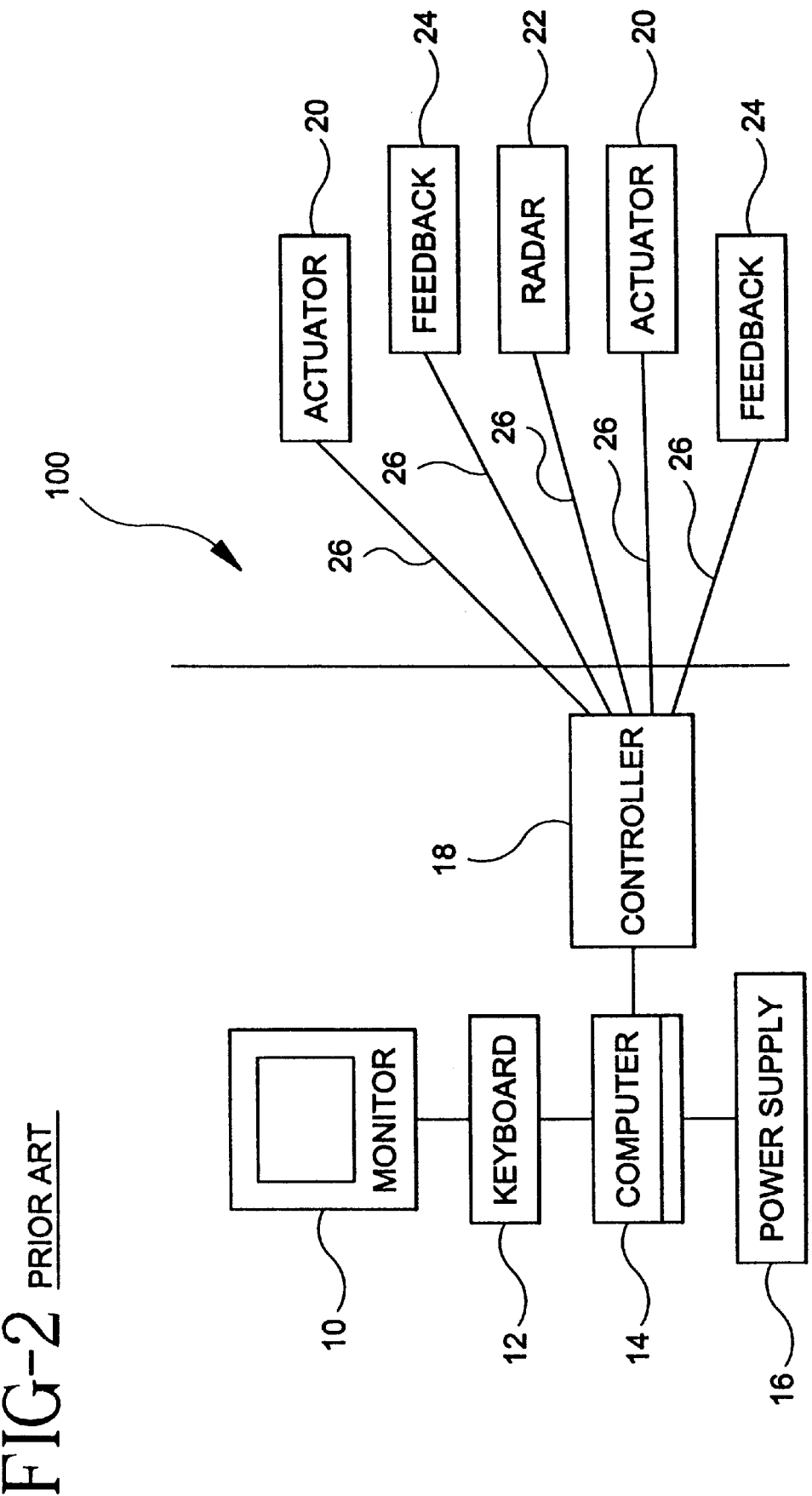
FIG. 2 is a simplified block diagram illustrating a variable rate product application machine control system disclosed in the prior art which may be adapted for use with the delay coordination system depicted in FIG. 1.

Making reference now to FIG. 2, one control system 100 is illustrated having a cab mounted host computer 14, keyboard 12, monitor 10, and a single controller module 18. The controller module 18 is coupled via communication cables 26 to distinct actuator devices 20 and feedback devices 24. As stated herein above, the delay time associated with each metering point is preprogrammed into algorithmic software or can be entered into the host computer 14 via keyboard 12. When used in conjunction with a GPS receiver 52 and/or a radar device 54, the computer 14 can be programmed in accordance with the present invention such that as the variable rate machine traverses the field to be planted or apply crop inputs, each actuator 20, i.e. release point actuator, will be individually and distinctly activated automatically to compensate for delays in the flow of product seen between product emerging from its respective storage device release point and subsequently emerging from its associated product dispensing point 80 attached to the variable rate machine.

Figure 3:
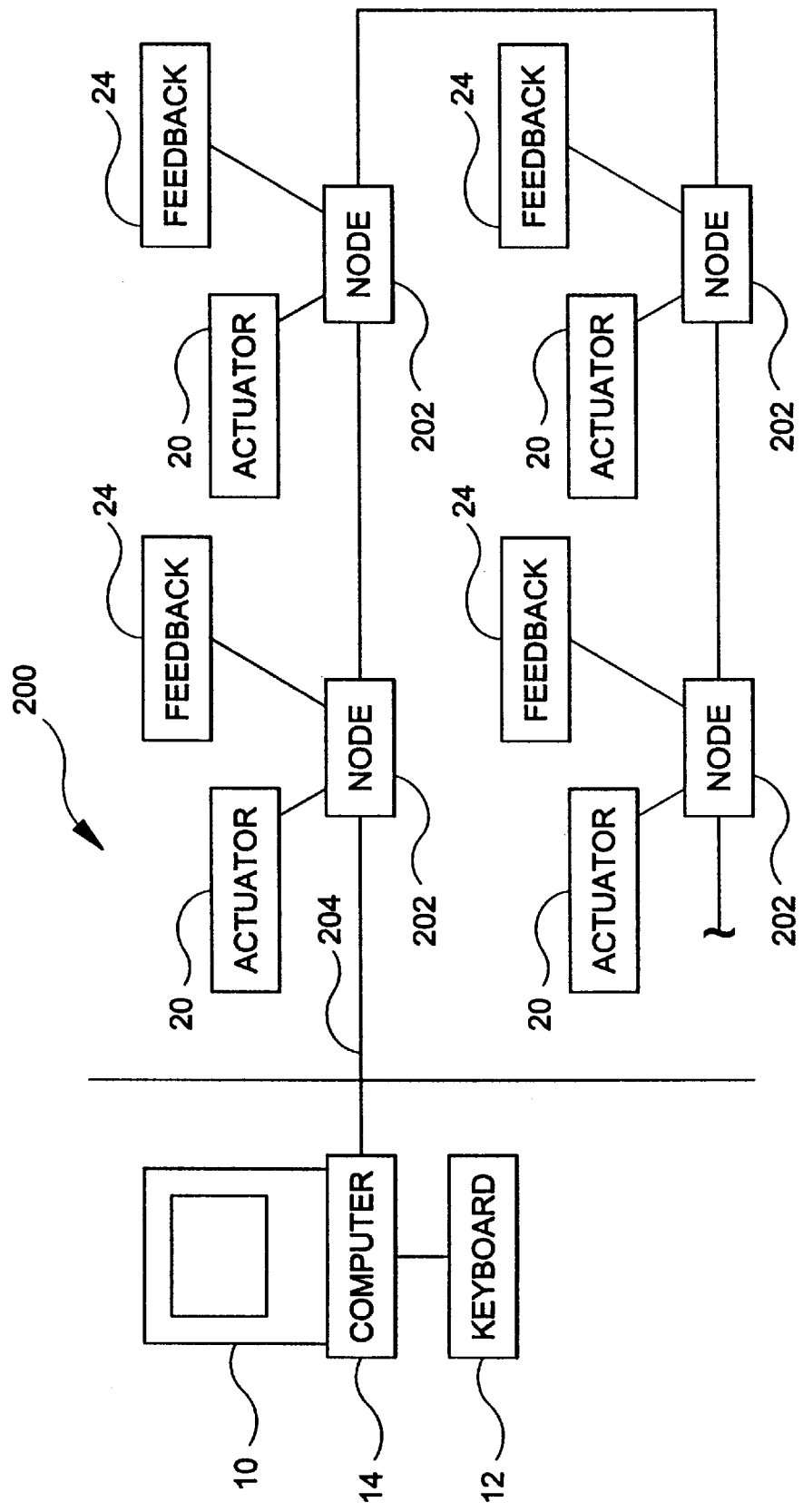
FIG. 3 is a simplified block diagram illustrating a FALCON® variable rate product application machine control system which may be adapted for use with the delay coordination system depicted in FIG. 1.
Figure 4:
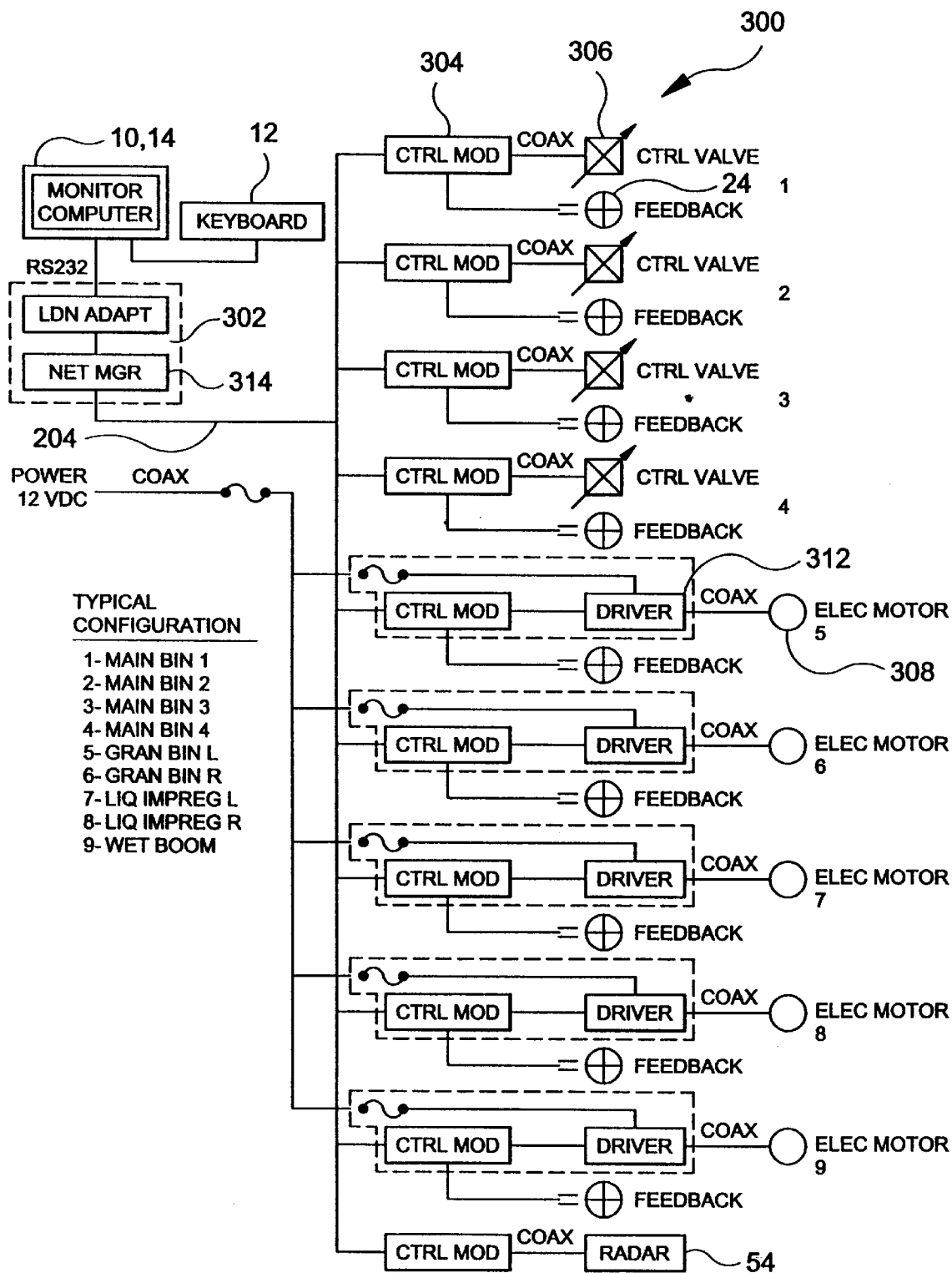
FIG. 4 is a more detailed block diagram of the FALCON® variable rate product application machine control system illustrated in FIG. 3.

Looking now at FIG. 3, another control system 200 known as FALCON® is illustrated having a cab mounted host computer 14, keyboard 12, monitor 10, and further having multiple independent nodes 202. Each node 202 can include a unique and distinct control module 304 capable of two-way communication between the host computer 14 and the respective node 202 and also between an actuator 20 such as a bin pump (metering device) 62, or between a particular flow sensor 56, 58, 60 or set of sensors 56, 58, 60 and a respective node 202. Upon machine startup, the host computer 14 can prompt individual control modules 304 to interrogate each sensor 56, 58, 60, each product storage device, each transport system device, each product release device, e.g. bin pump 62, and/or dispensing device associated with that particular control module 304 via a feedback network 24 such as illustrated in FIG. 4. Before the machine is put into operation, the machine can be operated in a fully functional mode at a designated site such as the manufacturing plant to determine appropriate timing delays necessary to customize the machine according to the present invention. During the customization process, each control module 304 can interrogate each sensor 56, 58, 60 or device stated herein above necessary to properly customize the application machine. Presently, the best mode for implementing the present invention makes use of pre-measured timing delay data which is entered into the algorithmic software data base. However, it is anticipated by the present inventor that the timing delay data may also be automatically entered into the data base via incorporation of appropriate release point sensors and/or dispensing point sensors as well as algorithmic software within the control modules 304 and/or the host computer 14. The control modules 304 then communicate the necessary timing delay data to the host computer 14 where the timing delay data is stored in a data base for use by the present inventive delay coordination system 50. As stated herein before, the control system 300 can be adapted to include a GPS receiver 52 such that the host computer 14, GPS receiver 52, and/or radar device 54 function to track and anticipate a field reference point utilizing machine location, speed, and direction in a manner that allows the host computer 14 and control modules 304 to compensate for each timing delay identified on the variable rate application machine in accordance with the present invention. Control system 300 can also be adapted to operate in accordance with the present invention using a "Dead Reckoning" system, as stated herein above. The control systems 100, 200, 300 described herein are disclosed in more detail in the '924 patent referenced herein before and incorporated in its entirety by reference herein, and so further details will not be discussed to preserve clarity and brevity.

Figure 5:
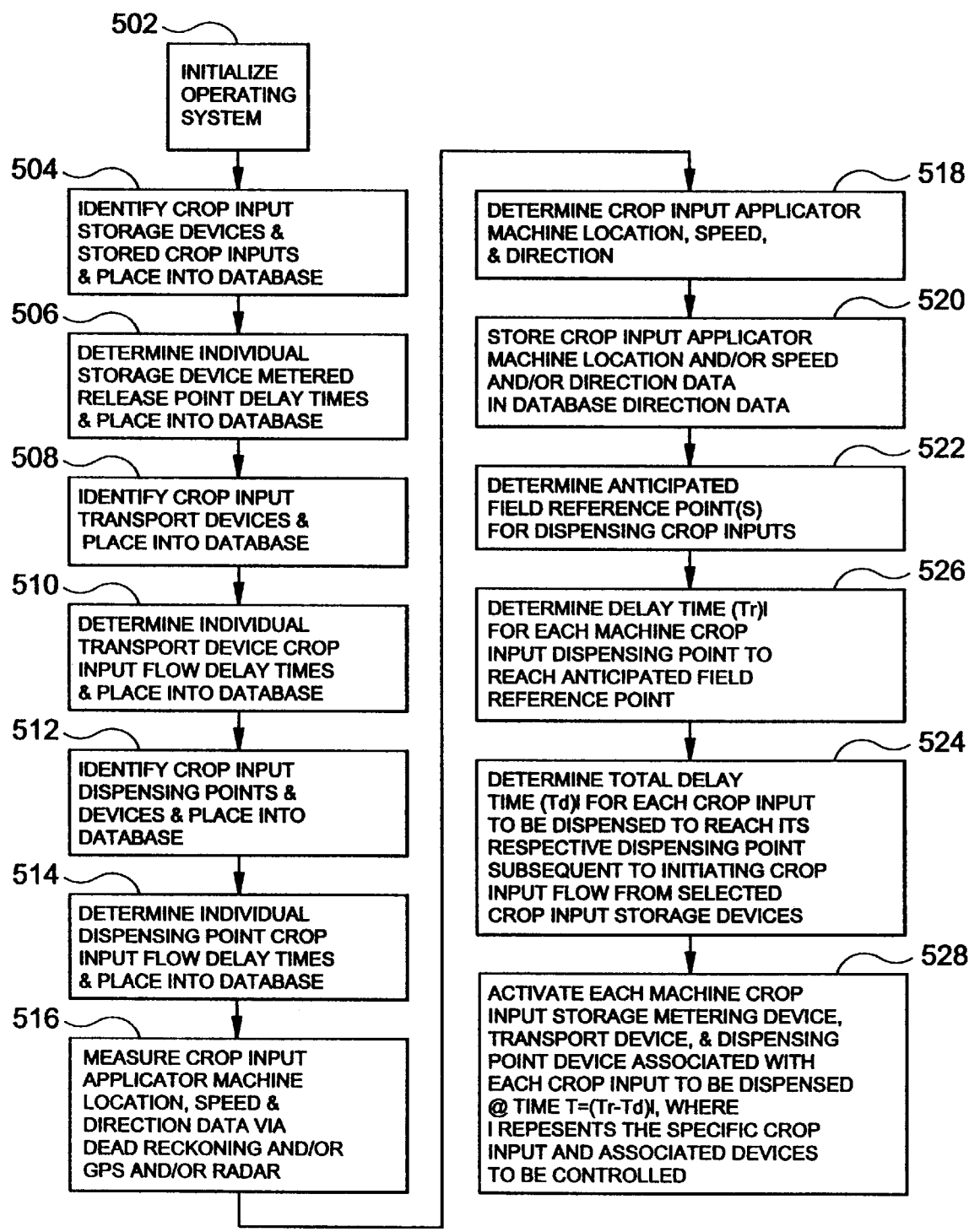
FIG. 5 is a simplified flow diagram illustrating operation of the present inventive delay coordination system to simultaneously control a plurality of agricultural products (crop input) application distribution attributes associated with a variable rate, multiple product application machine.

FIG. 5 is a simplified flow diagram illustrating operation of the present inventive delay coordination system 50 to simultaneously control a plurality of product release points 306 attached to a variable rate multiple product application machine. Starting with block 502, the host computer 14 and/or the control modules 304 attached to the application machine are initialized by booting the system 50, thereby activating the operating system containing the software algorithms discussed hereinafter. As used herein, the words "software algorithms" mean algorithmic programs used to direct the processing of data by a computer or data processing device. Following the boot-up or initialization procedure 502, each specific product storage device, i.e. bin (single and/or multi-compartment), tank, hopper, etc., is identified as shown in block 504 and assigned crop input release point delay data which is unique for each type of product storage device. The delay data for each storage device attached to the machine is then placed into a data base as shown in block 506. Presently, the aforesaid timing delay data is preprogrammed into the data base along with any other timing delay data described herein below. Following entry of the aforesaid crop input release point delay data into the database, each product transport device, i.e. conveyor, spray boom (dry and/or wet), etc., is identified as shown in block 508 is also assigned crop input flow time delay data which is unique for each type of transport device. Similarly, the time delay data for each transport device attached to the machine is then placed into a data base as shown in block 510 and subsequently utilized to enable each product transport device to be ground-speed coordinated as described herein after. The identification and data assignment procedures discussed above are then repeated for each dispensing device, i.e. spray nozzle, spreading wheel, etc., as depicted in blocks 512 and 514. As stated herein before, the aforesaid identification of specific features of the machine and accumulation of associated time delay data into a data base may be accomplished either manually or automatically using product application control system structures and procedures discussed herein above adapted with appropriate sensors and algorithmic software in accordance with the present invention. Presently, the aforesaid time delay data is premeasured and preprogrammed into the data base. Once the machine signature process is complete, and each distinct feature and its associated time delay data have been accumulated in a data base, the variable rate application machine can then be put into operation utilizing a "Dead Reckoning" system, or a GPS receiver 52 and/or a radar device 54 to track and anticipate particular field reference points, utilizing the machine location, speed, and direction data as shown in blocks 516 and 518. The machine location, speed, and direction data are then stored in a data base as shown in block 520. As stated herein above, any reference to speed means velocity, including speed and instantaneous machine direction. The aforesaid location, speed, and direction data is then extracted from the data base to determine ongoing anticipated reference points for dispensing the desired application products (crop inputs) as shown in block 522. The foregoing process is utilized to construct a signature or machine data base for the variable rate, multiple crop input machine as it traverses a field. Data sufficient to determine an appropriate delay time (Td) for each machine metered release point as well as the time it will take each dispensing point to reach a designated anticipated reference point (Tr) is then extracted from the data base for use by the host computer 14 in calculating a coordination factor (T=Tr−Td) shown in blocks 524, 526, and 528. Each product release point is then blue printed with its own unique coordination factor for use by an associated controller module as discussed herein before. As the application machine traverses a field, each product storage metering release point device, metering transport device, and metering dispensing device can then be activated to ensure that the associated dispensing point begins to emit desired products at the proper time (Tr−Td), thereby assuring a desired product mix and/or prescriptive quantity of products (crop inputs) are dispersed at the anticipated location when the application machine arrives at the anticipated location in the field. It will be appreciated that the foregoing process will apply equally to accomplish individual control of unique crop input product metered release points and associated dispensing points distributed on the variable rate application machine.

Figure 6:
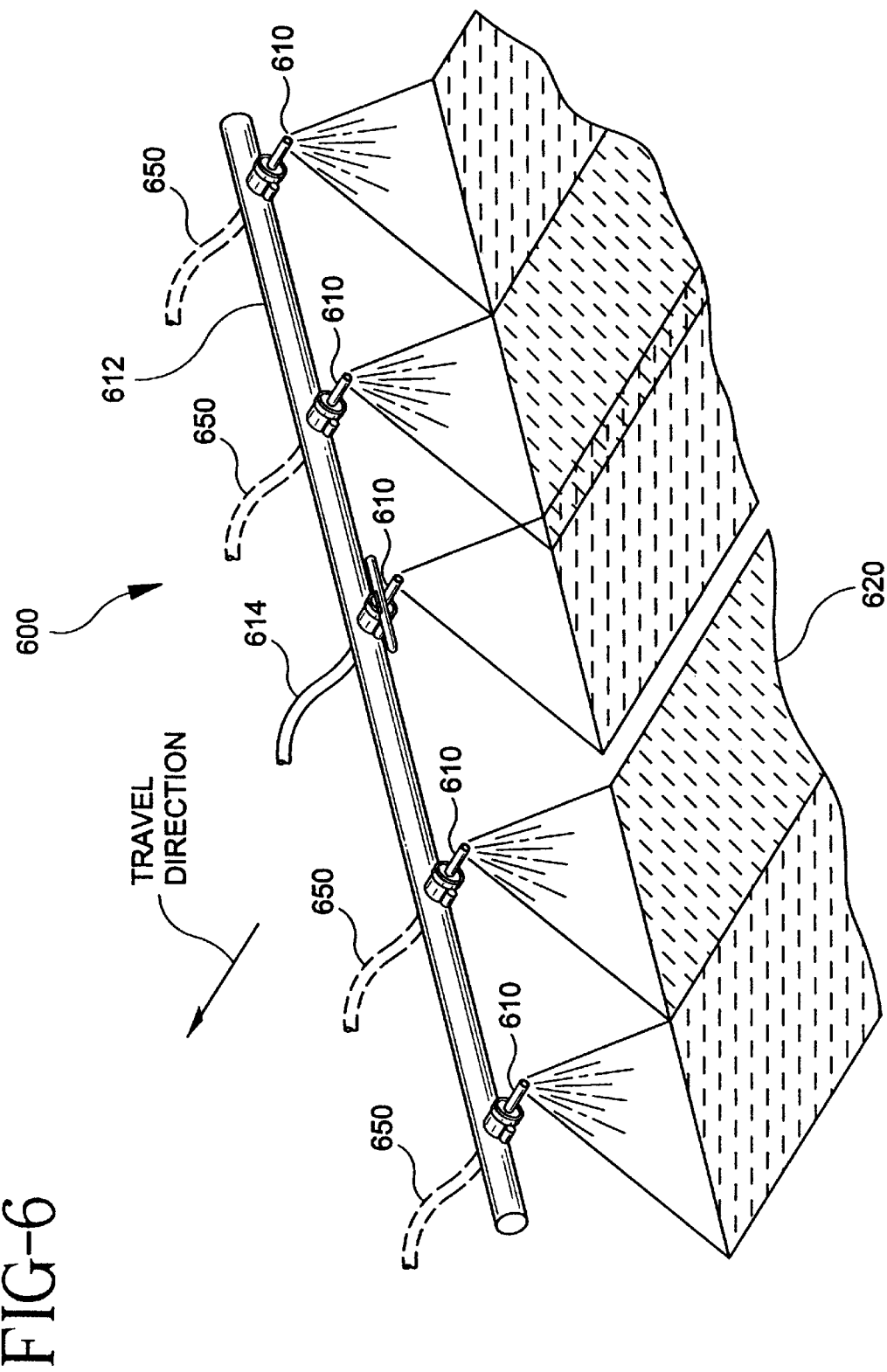
FIG. 6 is a perspective view of a wet boom for spreading a liquid product upon the ground, and which is suitable for use with the present inventive delay coordination system.

FIG. 6 illustrates one embodiment for a wet boom assembly 600 having a plurality of spray nozzles 610 attached to a liquid or slurry product carrying manifold 612. The present invention is not limited to use with a wet boom however, and it will be appreciated that a wet boom has been exemplified for ease and clarification when describing a particular embodiment for the present invention. Wet boom assemblies having a single product supply conduit 614 are known to those familiar with the agronomic industry. The wet boom assembly 600 has a fluid transmitting conduit 614 which couples the product flow between the product storage device, i.e., tank to which it is attached, and the manifold 612. It will readily be appreciated that when using boom systems such as the boom assembly 600 depicted in FIG. 6, that product entering the manifold 612 via conduit 614 will be first dispensed from those spray nozzles 610 located closest to the attached conduit 614 and will be dispensed last from those spray nozzles 610 located furthest from the attached conduit 614 when using a wet boom assembly having a single product supply conduit 614. Therefore, it becomes undesirable to initiate product flow to the boom assembly 600 with a single fixed composite delay compensation scheme which affects each spray nozzle 610 equally. What is desirable and needed in the agronomic industry is a scheme whereby each spray nozzle 610 is attached to its own individually metered supply conduit as illustrated by combined reference numerals 614, 650. Such a modification of boom system 600 will allow the boom assembly 600 to be adapted for use with the present inventive delay coordination system 50. For example, when a variable rate, multiple product (crop input) application machine is traversing a field on its way to an anticipated location, each product flowing through each specific spray nozzle 610 can then be initiated utilizing its own unique delay coordination scheme to assure accurate and precise applications of crop inputs at the anticipated location when the machine arrives at the anticipated location in the field. As stated herein above, the present invention is not limited to use with a wet boom, however. The aforesaid delay coordination scheme is just as easily adaptable for use with dry boom systems or combinations of dry boom systems and wet boom systems, as well as planters, drills, spinners, drop tubes, injectors, etc. as discussed herein before.

Figure 7:
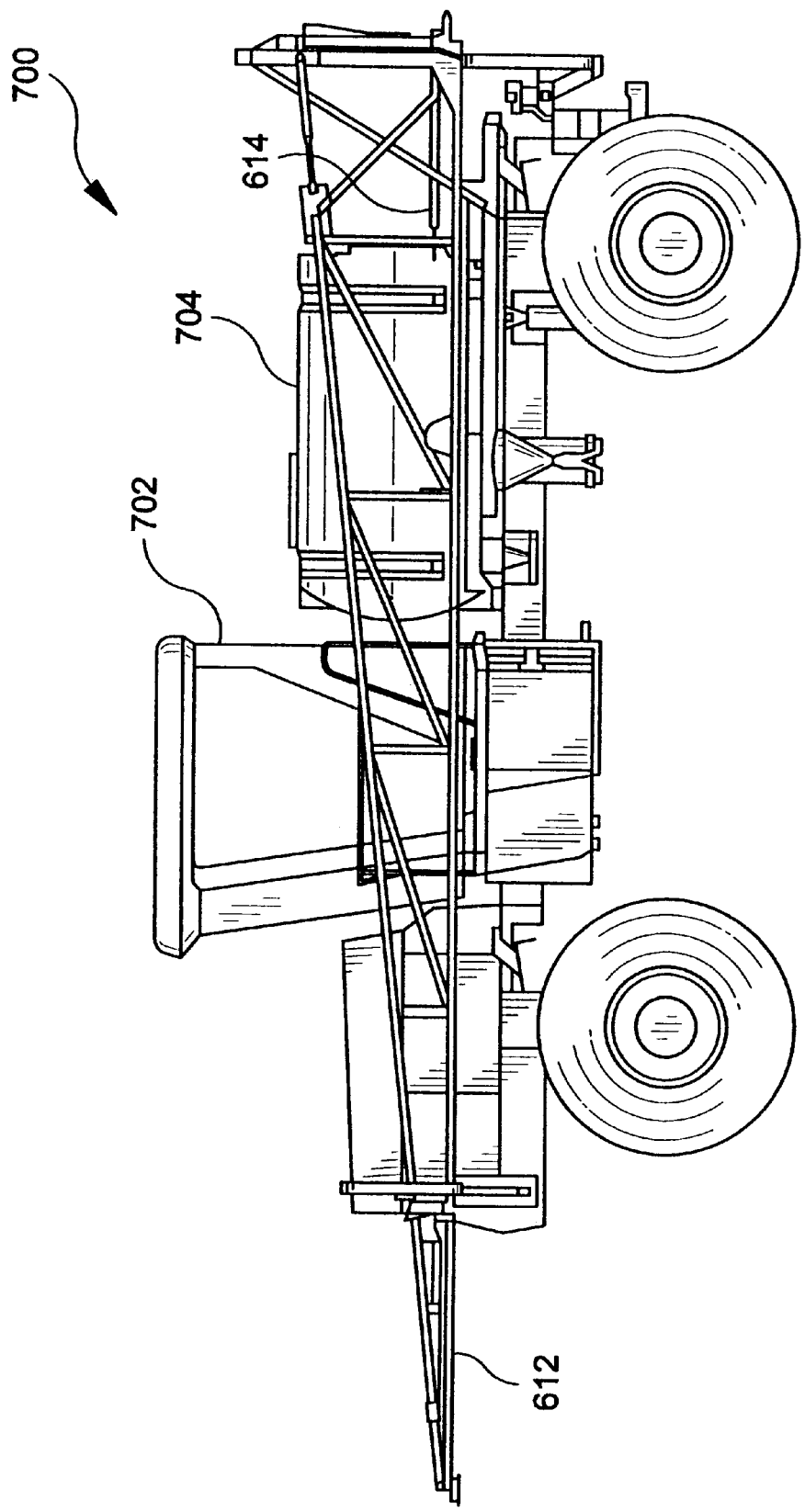
FIG. 7 is a side view of a multiple product application machine having a product storage tank and a wet boom such as that illustrated in FIG. 6, and which is adaptable for use with the present inventive delay coordination system shown in FIG. 1.

Moving now to FIG. 7, a side view of a common product application machine 700 familiar to some skilled in the agricultural industry, and having a product storage tank 704 and a wet boom assembly 600 such as that illustrated in FIG. 6, and which is adaptable for use with the present inventive delay coordination system 50 is illustrated. Product stored in the tank 704 is supplied to the boom manifold 612 via the supply conduit 614, as stated above. As stated herein before, the machine 700 may be adapted for use with the present invention simply by providing the machine 700 with a metered supply conduit 614, 650 which is unique to each spray nozzle 610.

Figure 8:
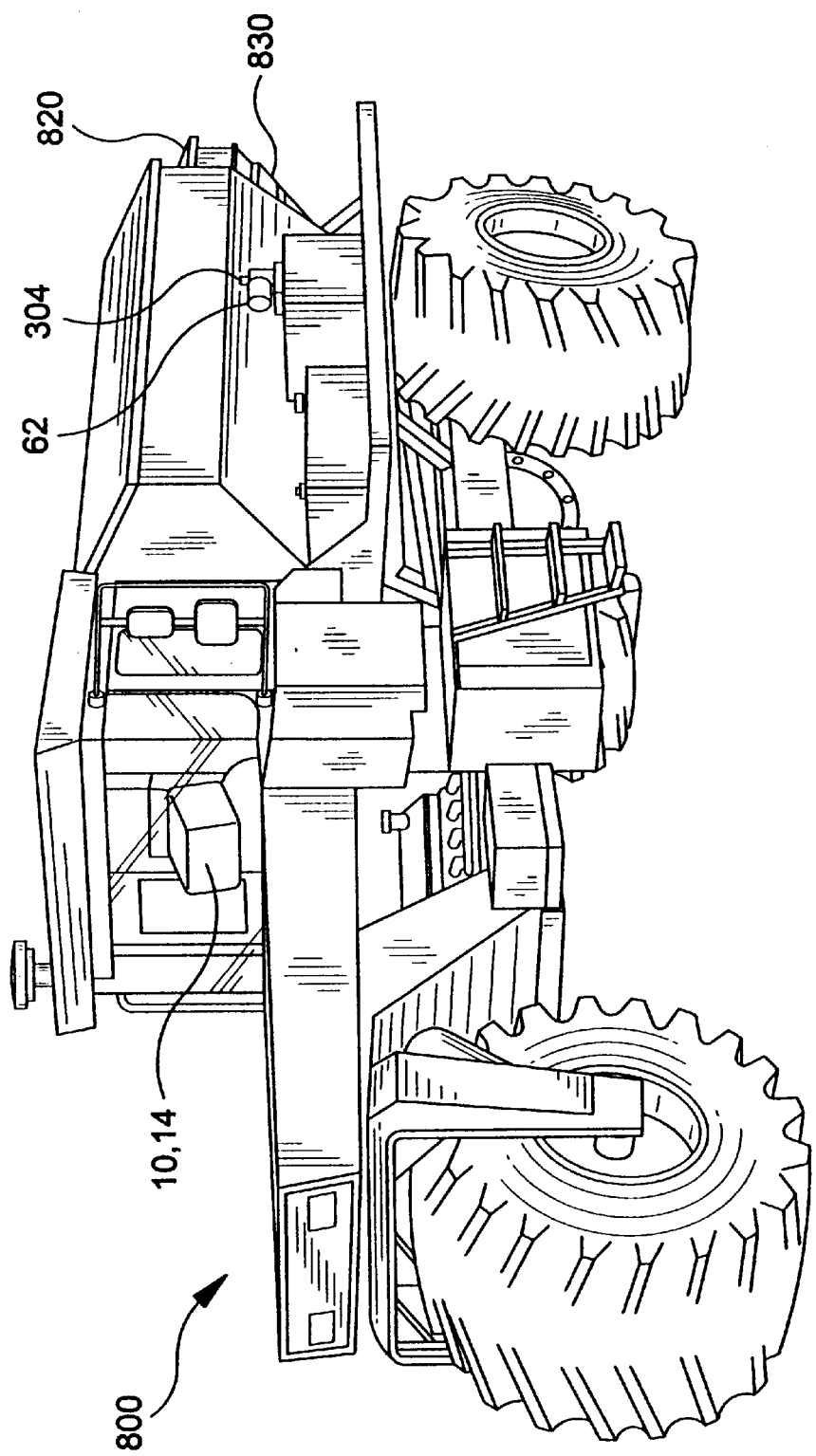
FIG. 8 is a perspective view of a multiple product application machine having a multi product box suitable for applying crop inputs at variable rates and which is adaptable for use with the present inventive delay coordination system shown in FIG. 1.
Figure 9:
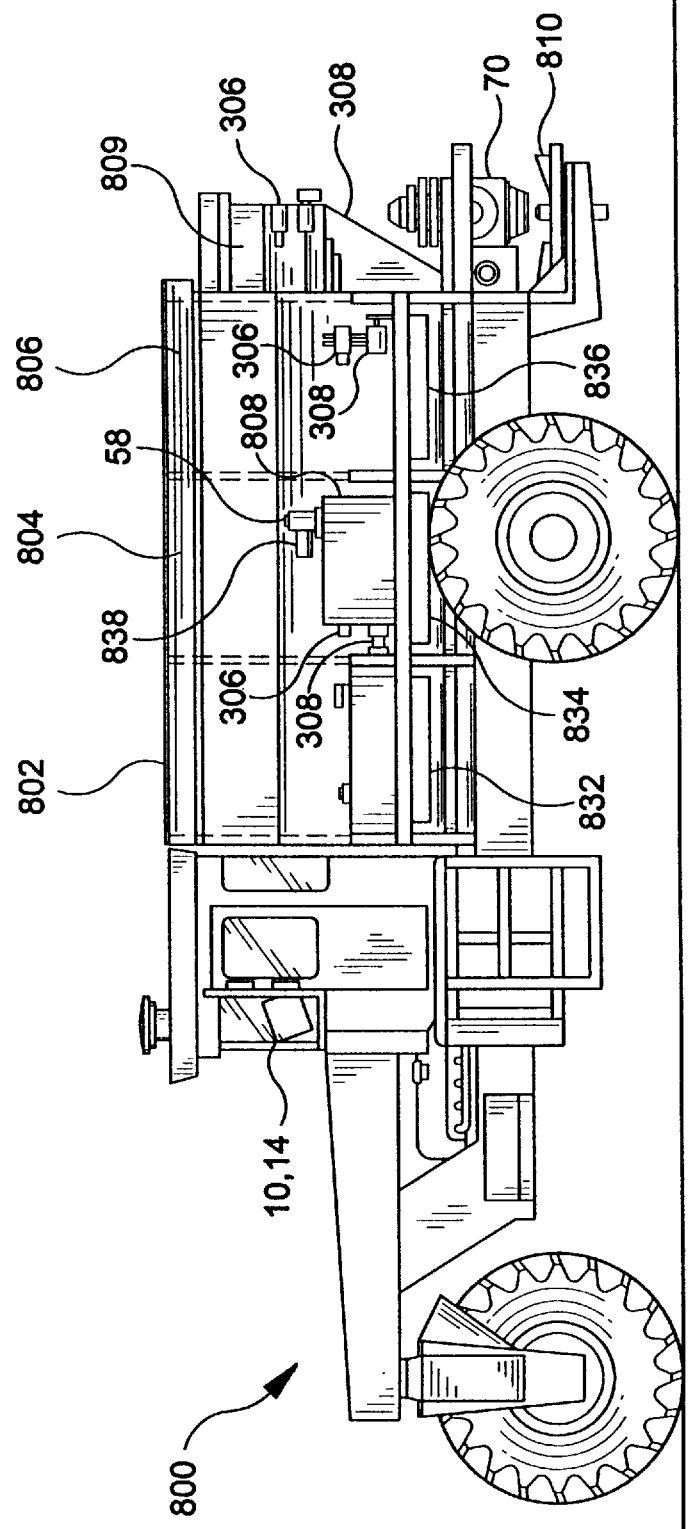
FIG. 9 is a detailed side view of the multiple crop input application machine having a multi product box illustrated in FIG. 8.

Another type of product application machine 800 known to those familiar with the agronomic industry, having multiple product storage bins 802, 804, 806, 808, 809 and a spreading wheel 810 is illustrated in FIGS. 8 and 9. Such machines are compatible for use with computerized control systems such as described in the '773 patent discussed herein above and incorporated by reference in its entirety herein. Generally, a host computer 14 is used in combination with a monitor 10 such as a CRT which is located within the operator cab 702 for use by a machine operator to move the machine 800 to an anticipated location in a field to dispense desired product mixes and/or prescriptive quantities of product (crop inputs) when the variable rate machine 800 reaches the anticipated location in the field. A more detailed view of the product application machine 800 is depicted in FIG. 9. The embodiment illustrated includes multiple storage bins 802, 804, 806, 808, 809 for storing a plurality of planting or crop input products, or alternatively for storing identical products chained together via storage bin 802, 804, 806, 808, 809 interconnecting devices which allow the application machine to switch back and forth between desired bins storing the same product during the spreading process. Prior use of systems such as the one described above for variable rate application of crop inputs have inaccurately compensated for time delays between initiating the release of product onto a material transport device 70 and the actual dispensing of the product using a single estimated or average composite delay time for the variable rate application machine viewed as a single dispensing point traversing a field. As stated herein before, such an approach is known by the present inventor to be significantly less than optimum since any variable rate multiple product (crop input) application or spreading machine 700, 800 having multiple products, product storage devices, release points 830, 832, 834, 836, 838, dispensing points 80, and/or material transport devices 70 will not accurately, precisely and simultaneously apply all products to be dispensed to a plurality of anticipated reference points in a field as the machine traverses the field, due to the interacting influence of multiple processing delays from a plurality of sources on-board the machine. Therefore, as stated and described herein above, the present invention provides a system and process for accurately and precisely delivering specific blends and/or prescriptive quantities of seeds or other agricultural products (crop inputs) to an anticipated reference site in a field as a function of a multi delay coordination scheme which more accurately characterizes and compensates for the effects attributed to the spreading process by a plurality of system and processing delay variables associated with a particular machine. The present invention therefore, provides a structure and method of customizing any variable rate multiple product application or spreading machine, powered or towed, based on the particular machine signature or identity, rather than providing a standard, estimated, or average composite structure and method to be applied across the board to any application or spreading machine which has hereto before been generally known and accepted by some skilled in the agricultural product (crop input) application arts.

Figure 10:
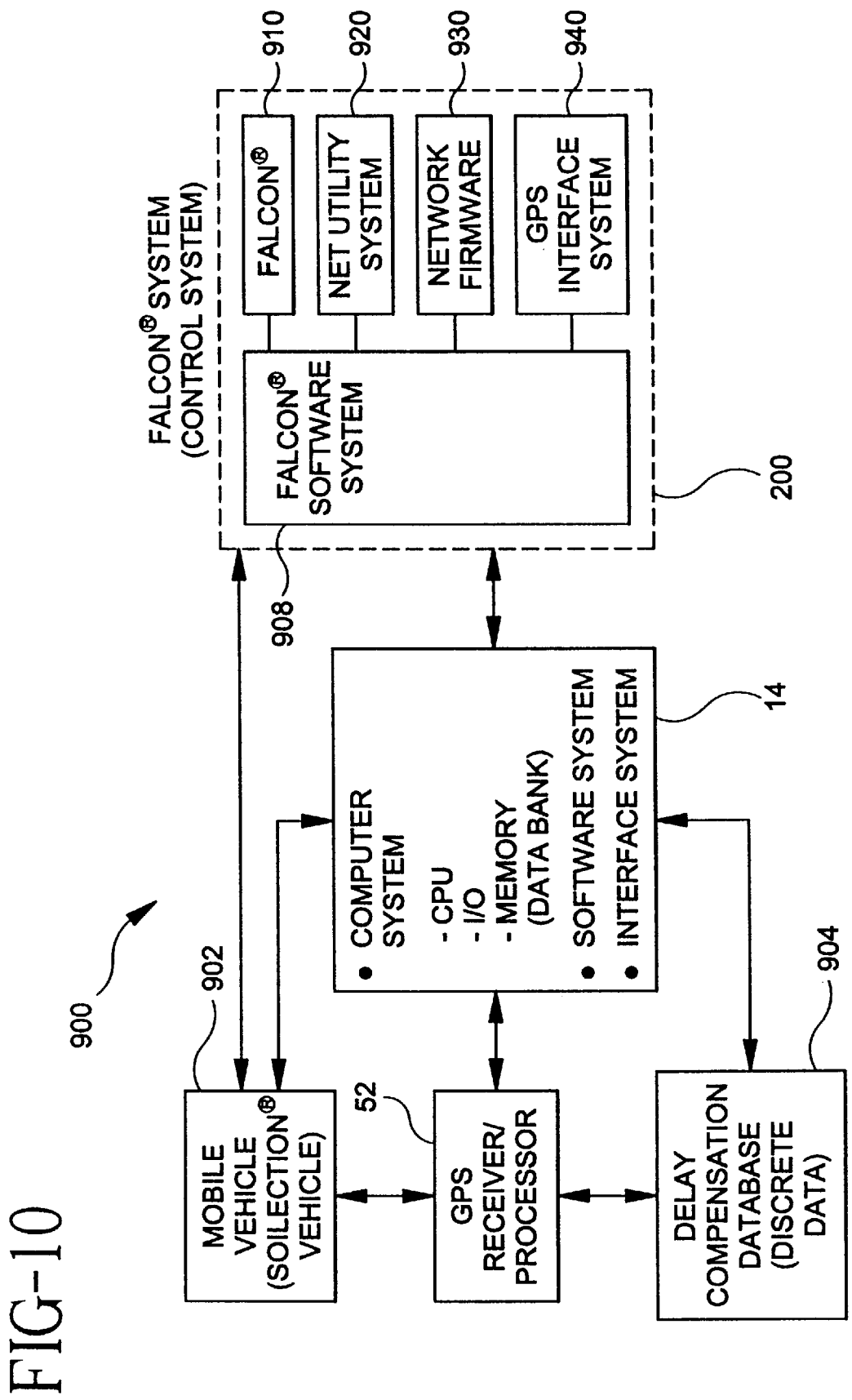
FIG. 10 is a simplified block diagram illustrating implementation of the present delay coordination system onboard a SOILECTION® machine having a FALCON® variable rate control system.

FIG. 10 is a simplified block diagram illustrating implementation of the present delay coordination system 50 on board a SOILECTION® machine 902 having a FALCON® control system 200 manufactured by Ag-Chem Equipment Company, Inc. of Minnetonka, Minn. The SOWLECTION® machine 902 is described in detail in U.S. patent application Ser. No. 08/452,894, abandoned, by Hauwiller et al., which is assigned to Ag-Chem Equipment Company, Inc. of Minnetonka, Minn., and incorporated by reference herein in its entirety. The invention is implemented to enhance a resident data base, such as for example, a geographical information system (GIS) like the SOILECTION® Geographical Information System (SGIS), also manufactured by Ag-Chem Equipment Company, Inc. of Minnetonka, Minn., and to provide accurate data to application programs for use by the FALCON® (Fertilizer Applicator Local Control Operating Network) Control System 200. This implementation of the invention includes use of a Global Positioning System (GPS) 52 having a GPS receiver and an associated data processor, such as described herein above. The GPS receiver and data processor 52 is hosted by the SOILEC-TION® machine 902. Generally, the GPS system 52 is initiated when the receiver starts to track pseudorandom noise from a group of satellites and generates time of arrival times for an anticipated reference point by the product application machine. Thereafter, the GPS data processor takes over.

Accordingly, the SOILECTION® machine 902 receives GPS data which information is integrated with the delay coordination data determined and stored in a data base 904 as illustrated in FIG. 5 and discussed in detail herein before to establish the exact moments in time each machine release point metering device, e.g. actuator 20 must be actuated to accurately and precisely apply the desired planting and/or crop input products as the SOILECTION® machine 902 traverses the field. The delay coordination data is integrated with the SOWLECTION® machine 902 controls through the FALCON® system 200. The FALCON® system 200 includes the FALCON® software system 908. The subdirectories of the FALCON® software 908 include: FALCON® 910 which functions as host system and interface; net utility system 920 which functions as a network utilities and diagnostics software; network firmware 930 in which a downloadable code such as Neuron C® resides, and GPS interface system 940 which is a dedicated section of the software dealing with GPS data reception and processing. More detailed descriptions of specific FALCON® system 200 applications are disclosed in the '924 patent referenced above, as well as U.S. Patent Application by Robert J. Monson, entitled INTELLIGENT MOBILE PRODUCT APPLICATION CONTROL SYSTEM, filed Dec. 13, 1995, Ser. No. 08/915,847 and U.S. Pat. No. 5,757,640 by Robert J. Monson, entitled PRODUCT APPLICATION CONTROL WITH DISTRIBUTED PROCESS MANAGER FOR USE ON VEHICLES, filed Jan. 24, 1996, and issued May 26,1998 all incorporated by reference in their entirety herein.

As may be readily understood from FIG. 10, the delay coordination system 50 acquires time delay data which is stored in a data base 904 as described above, and interacts with the FALCON® system 200 to automatically determine and implement the precise moments in time each metering device in the product flow stream is actuated, thereby further enabling the automation and enhancing the art of site-specific farming.

Figure 11:
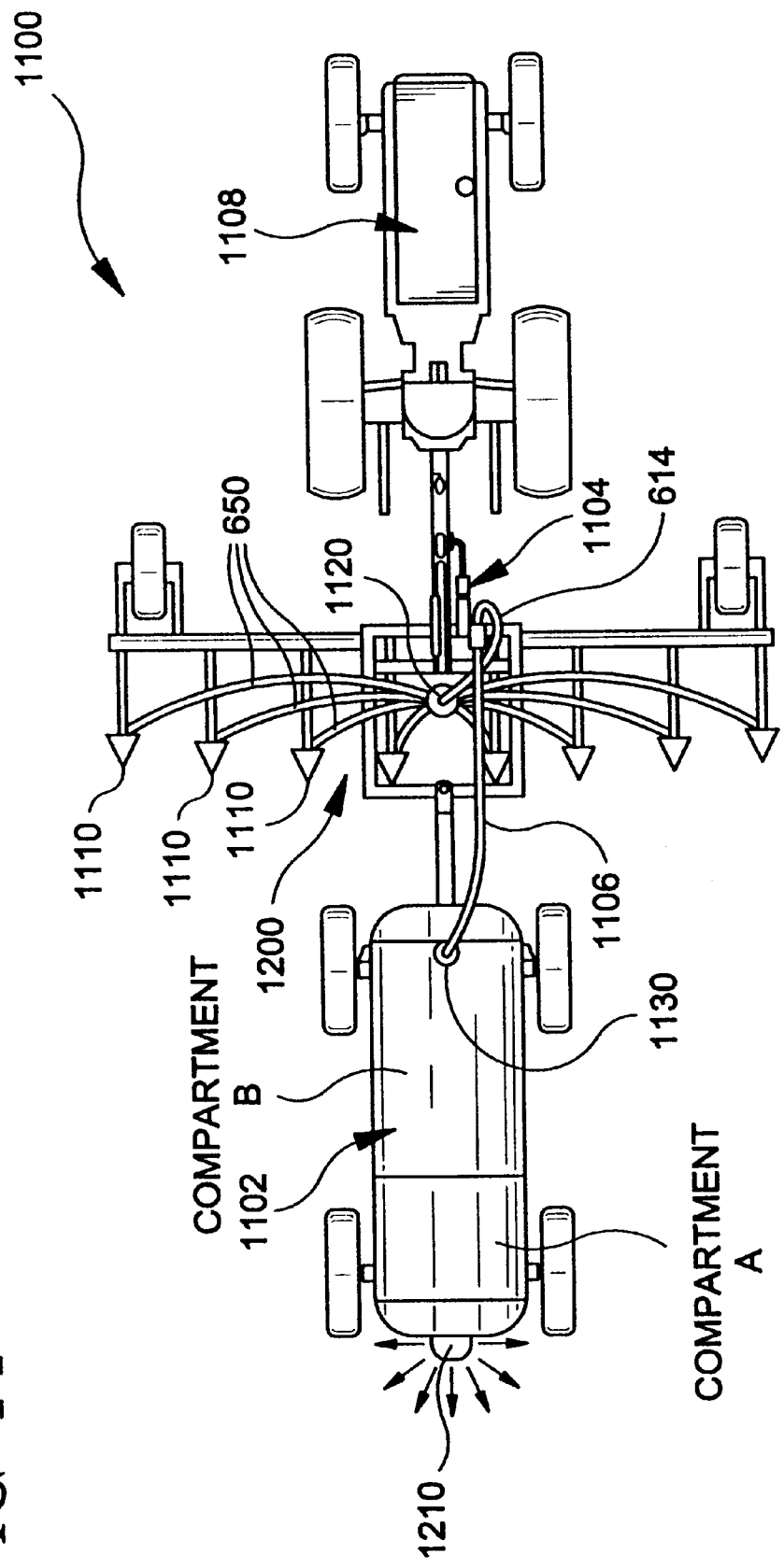
FIG. 11 is a top view of a multiple combination crop input application system suitable for use with the present delay coordination system.

Looking now at FIG. 11, one embodiment of a variable rate multiple combination crop input system enumerated as 1100 suitable for use with the present inventive delay coordination system 50 is illustrated. The variable rate, multiple crop input system 1100 includes a powered vehicle 1108 such as a tractor, but could just as well be a crop input application vehicle such as a TERRA-GATOR® machine with a fertilizer application system attached as manufactured by Ag-Chem Equipment Company, Inc. of Minnetonka, Minn. or a Lor*Al chassis with an Air-Max® system attached as manufactured by Lor*Al Products, Inc. of Benson, Minn., or any other type of variable rate crop input applicator machine, for example. System 1100 has a single point hitch crop input application system indicated generally at 1104, including a crop input storage tank 1102, a cultivator, and a tool bar or other implement 1200. A crop input supply hose 1106 leading from a metering valve 1130 on storage tank 1102 supplies a crop input to metering valve 1120 for distribution to individual chisels or other dispensing point elements 1110 via individually metered material transport supply hoses 650. A spreader device 1210 is shown generally attached to the rear end of storage tank 1102 and is adapted to spread a selected crop input over the ground surface as the system 1100 traverses a field to be treated. The storage tank 1102 can be used for storing any crop input or combination of crop inputs such as phosphate fertilizer, anhydrous ammonia, or any other crop input such as discussed herein before. The present invention is most preferably applicable for use with a multiple compartment tank however. Any multiple compartment tank 1102 having two or more individual compartments, such as depicted as "A" and "B" in FIG. 11, can be easily adapted for use with the present delay coordination system 50. Each metering device 1120, 1130, spreader device 1210, and any dispensing point devices 1110 can then be individually controlled via metering actuator mechanisms 306 such as depicted in FIG. 4 utilizing the delay coordination system 50 and algorithmic methods described herein before to ensure each crop input to be dispensed at a designated field reference point will be combined to achieve the desired prescription and quantity of crop inputs based upon formerly measured conditions and values at the designated field reference point.

This invention has been described herein in considerable detail in order to comply with the patent statutes and to provide those skilled in the art with the information needed to apply the novel principles and to construct and use such specialized components as are required. In view of the foregoing descriptions, it should be apparent that the present invention represents a significant departure from the prior art in construction and operation. Further it provides for improving the quality of crop yield and affords a more environmentally desirable approach to site specific farming by eliminating or significantly reducing inaccuracies and imprecision during planting or application of other crop inputs to a field. However, while a particular embodiment of the present invention has been described herein in detail, it is to be understood that various alterations, modifications and substitutions can be made therein without departing from the spirit and scope of the present invention, as defined in the claims which follow. For example, it will be apparent to those skilled in the agricultural industry that although particular storage devices, crop input transport mechanisms, crop input release points and dispensing points have been illustrated, that many other storage devices, crop input transport mechanisms, release points and dispensing points will also work to provide the intended functions of accurately compensating for multiple time delays onboard a variable rate multiple crop input application machine which affect the accuracy of product delivery to an anticipated reference point in a field being traversed by a variable rate spreading or product application (crop input) machine. It will also be understood that the present invention will also work with any multiple combination of powered and/or towed crop input variable rate, multiple product applicator machines including side-by-side combinations and tandem combinations, to ensure a desired prescription and quantity of crop inputs is delivered to an exact field point based upon formerly measured conditions and values at that exact field point, as the multiple combination of crop input applicator machines traverses a field to be treated.

I claim:

1. A mobile agricultural products crop input application system comprising:

a machine having a plurality of agricultural products crop dispensing points;

an actuator operatively coupled to each dispensing point within a majority of said plurality of product dispensing points on said machine;

a machine positioning system operatively coupled to said machine for anticipating a field reference point and generating anticipated field reference point data as said machine traverses a field; and a delay compensation system in communication with said machine, said delay compensation system including:
 a data processor;
 a data input device in communication with said data processor;
 an algorithmic software directing said data processor; and
 a data storage unit, wherein discrete delay data associated with each distinct said dispensing point within said majority of dispensing points is stored and supplied to said data processor such that said data processor, directed by said algorithmic software, can automatically determine discrete time data for activating each said dispensing point actuator using said discrete delay data, said anticipated field reference point data, and algorithmically defined interrelationships between said discrete delay data and said anticipated field reference point data such that each said dispensing point actuator associated with said majority of dispensing points is activated at a unique relative discrete moment in time as said machine traverses said field.

2. The mobile crop input application system of claim 1 further comprising at least one control module in communication with said data processor such that said at least one control module can access said discrete time data in said data storage unit to activate each said dispensing point actuator at said unique relative discrete moment in time.

3. The mobile crop input application system of claim 1 wherein said machine is self-propelled.

4. The mobile crop input application system of claim 1 wherein said machine is equipped for towing.

5. The mobile crop input application system of claim 1 further comprising at least one data sensor in communication with said data input device for updating at least a portion of said discrete delay data on a real time basis.

6. A mobile agricultural products crop input application system comprising:
 a machine having a plurality of agricultural products crop input storage devices;
 an actuator operatively coupled to each storage device within a majority of said plurality of crop input storage devices on said machine;
 a machine positioning system operatively coupled to said machine for anticipating a field reference point and generating anticipated field reference point data as said machine traverses a field; and
 a delay compensation system in communication with said machine, said delay compensation system including:
  a data processor;
  a data input device in communication with said data processor;
  an algorithmic software directing said data processor; and
  a data storage unit, wherein discrete delay data associated with each distinct said storage device within said majority of storage devices is stored and supplied to said data processor such that said data processor, directed by said algorithmic software, can automatically determine discrete time data for activating each said storage device actuator using said discrete delay data, said anticipated field reference point data, and algorithmically defined interrelationships between said discrete delay data and said anticipated field reference point data such that each said storage device actuator associated with said majority of storage devices is activated at a unique relative discrete moment in time as said vehicle traverses a field.

7. The mobile crop input application system of claim 6 further comprising at least one control module in communication with said data processor such that said at least one control module can access said discrete time data in said data storage unit to activate each said storage device actuator at said relative discrete moment in time.

8. The mobile crop input application system of claim 6 wherein said machine is self-propelled.

9. The mobile crop input application system of claim 6 wherein said machine is equipped for towing.

10. The mobile crop input application system of claim 6 further comprising at least one data sensor in communication with said data input device for updating at least a portion of said discrete delay data on a real time basis.

11. A mobile agricultural products crop input application system comprising:
 a machine having a plurality of agricultural products crop input transport devices;
 an actuator operatively coupled to each transport device within a majority of said plurality of transport devices on said machine;
 a machine positioning system operatively coupled to said machine for anticipating a field reference point and generating anticipated field reference point data as said machine traverses a field; and
 a delay compensation system in communication with said machine, said delay compensation system including:
  a data processor;
  a data input device in communication with said data processor;
  an algorithmic software directing said data processor; and
  a data storage unit, wherein discrete delay data associated with each distinct transport device within said majority of transport devices is stored and supplied to said data processor such that said data processor, directed by said algorithmic software, can automatically determine discrete time data for activating each said transport device actuator using said discrete delay data, said anticipated field reference point data, and algorithmically defined interrelationships between said discrete delay data and said anticipated field reference point data such that each said transport device actuator associated with said majority of transport devices is activated at a unique relative discrete moment in time as said machine traverses a field.

12. The mobile crop input application system of claim 11 further comprising at least one control module in communication with said data processor such that said at least one control module can access said discrete time data in said data storage unit to activate each said transport device actuator at said unique relative discrete moment in time.

13. The mobile crop input application system of claim 11 wherein said machine is self-propelled.

14. The mobile crop input application system of claim 11 wherein said machine is equipped for towing.

15. The mobile crop input application system of claim 11 further comprising at least one data sensor in communication with said data input device for updating at least a portion of said discrete delay data on a real time basis.

16. A mobile agricultural products crop input application system comprising:

a crop input applicator machine;

means operatively coupled to said machine for storing, conveying, and dispensing a plurality of agricultural products crop inputs;

means operatively coupled to said storing, conveying, and dispensing means for activating a flow of said crop inputs via said storing, conveying, and dispensing means coupled to said machine;

means operatively coupled to said machine for anticipating a field reference point and generating anticipated field reference point data as said machine traverses a field; and a delay compensating means in communication with said machine, said delay compensating means including:

data processing means for processing crop input storing, conveying, and dispensing delay data and said field anticipated reference point data;

data input means in communication with said data processing means;

an algorithmic software directing said data processing means; and data storing means, wherein discrete delay data associated with said product storing, conveying, and dispensing means is stored and supplied to said data processing means such that said data processing means, directed by said algorithmic software, can automatically determine discrete time data for activating said actuating means using said discrete delay data, said anticipated field reference point data, and algorithmically defined interrelationships between said discrete delay data and said anticipated field reference point data such that desired portions of said actuating means operatively coupled to said product storing, conveying, and dispensing means are activated at unique relative discrete moments in time as said machine traverses a field.

17. The mobile crop input application system of claim 16 further comprising at least one control module in communication with said data processing means such that said at least one control module can access said discrete time data in said data storing means to activate portions of said actuating means at said unique relative discrete moments in time.

18. The mobile crop input application system of claim 16 wherein said machine is self-propelled.

19. The mobile crop input application system of claim 16 wherein said machine is equipped for towing.

20. The mobile crop input application system of claim 16 further comprising data sensing means in communication with said data input means for updating at least a portion of said discrete delay data on a real time basis.

21. A method of dispensing agricultural products crop inputs to a predetermined geographic land area comprising:

providing a machine having a plurality of crop input storage devices operably connected thereto;

causing said machine to travel over a desired surface area of said geographic land area;

determining an anticipated field reference point in real time;

providing discrete crop input release point delay time information unique to each crop input storage device within said plurality of crop input storage devices; and utilizing said unique release point delay time information and said anticipated field reference point to direct each crop input storage device within said plurality of product storage devices having a crop input to be released stored therein to release said stored crop input such that all stored crop inputs to be released are combined to achieve a predetermined prescription of crop input delivery to said anticipated field reference point as said machine traverses said predetermined geographic land area.

22. A method of dispensing agricultural products crop inputs to a predetermined geographic land area comprising:

providing a machine having a plurality of agricultural products crop input storage devices and at least one crop input transport device operably connected thereto;

causing said machine to travel over a desired surface area of said geographic land area;

determining an anticipated field reference point in real time;

providing discrete conveying delay time information unique to each said at least one crop input transport device; and utilizing said unique discrete conveying delay time information and said anticipated field reference point to direct each said at least one crop input transport device having a product conveyed thereon to commence transporting stored crop inputs to be dispensed such that all stored crop inputs to be dispensed are combined to achieve a predetermined prescription of crop input delivery to said anticipated field reference point as said machine traverses said predetermined geographic land area.

23. A method of dispensing agricultural products crop inputs to a predetermined geographic land area comprising:

providing a machine having a plurality of crop input dispensing points and at least one crop input storage device operably connected thereto;

causing said machine to travel over a desired surface area of said geographic land area;

determining an anticipated field reference point in real time;

providing discrete dispensing delay time information unique to each crop input dispensing point within said plurality of crop input dispensing points; and utilizing said unique discrete dispensing delay time information and said anticipated field reference point to direct each dispensing point having a crop input dispensed therefrom to commence dispensing stored crop inputs to be dispensed such that all stored crop inputs to be dispensed are combined to achieve a predetermined prescription of crop input delivery to said anticipated field reference point as said machine traverses said predetermined geographic land area.

24. A mobile agricultural products crop input application system for delivering a plurality of agricultural products crop inputs over a desired land area comprising:

a machine having a plurality of crop input release points for dispensing agricultural products, each release point having a characteristic delay time between initiating flow of the agricultural product and dispensing of the agricultural products;

a machine positioning system operatively coupled to said machine, said positioning system comprising at least one of a dead reckoning system, a global positioning system and a radar system; and a delay compensation system in communication with said release points and said machine positioning system, wherein said delay compensation system activates each crop input release point as a function of machine position information and the characteristic delay time for that release point such that a desired prescription of crop inputs is delivered to an exact field point determined via said positioning system as said machine traverses said land area, and wherein said desired prescription of crop inputs is based upon formerly measured conditions and values at said exact field point.

25. The mobile crop input application system of claim 24 further comprising an actuator operatively coupled to each crop input release point.

26. The mobile crop input application system of claim 25 wherein said machine is self-propelled.

27. The mobile crop input application system of claim 25 wherein said machine is equipped for towing.

28. The mobile crop input application system of claim 26 further comprising an algorithmic software directing said machine positioning system to generate exact field point data on a real time basis as said machine traverses said land area, wherein said exact field point data is used in combination with said desired prescription of crop inputs to coordinate operation of said crop input release point actuators.

29. The mobile crop input application system of claim 27 further comprising an algorithmic software directing said machine positioning system to generate exact field point data on a real time basis as said machine traverses said land area, wherein said exact field point data is used in combination with said desired prescription of crop inputs to coordinate operation of said crop input release point actuators.

* * * * *